United States Patent
Heske, III (10) Patent No.: US 6,189,792 B1
(45) Date of Patent: Feb. 20, 2001

(54) SYSTEM AND METHODS FOR EXEMPLAR BASED BAR CODE ERROR DETECTION AND CORRECTION

(75) Inventor: Theodore Heske, III, Suwanee, GA (US)

(73) Assignee: NCR Corporation, Dayton, OH (US)

( * ) Notice: Under 35 U.S.C. 154(b), the term of this patent shall be extended for 0 days.

(21) Appl. No.: 09/460,895

(22) Filed: Dec. 14, 1999

(51) Int. Cl.⁷ .................................................. G06K 7/10
(52) U.S. Cl. ................... 235/462.01; 235/462.12
(58) Field of Search ........................... 235/462.01, 462.02

(56) References Cited

U.S. PATENT DOCUMENTS

| 5,262,625 | 11/1993 | Tom et al. . |
|---|---|---|
| 5,276,316 | 1/1994 | Blanford . |
| 5,602,382 | * 2/1997 | Ulvr et al. .......................... 235/494 |
| 5,767,498 | 6/1998 | Heske, III et al. . |

\* cited by examiner

Primary Examiner—Harold I. Pitts
(74) Attorney, Agent, or Firm—Peter H. Priest (57) ABSTRACT

The present invention provides a system for correcting improperly printed or otherwise defective bar codes. The system scans a bar code and determines whether the scanned bar code data is correct. If the scanned bar code data is incorrect, the system uses the incorrect scanned bar code data to create a scan-based printhead model. The correct data is entered manually, and the manually entered data is used to construct an active printhead model. The scan-based and active printhead models are then compared in order to identify printhead defects, which are stored to correct future bar code scans.

12 Claims, 9 Drawing Sheets

SYSTEM AND METHODS FOR EXEMPLAR BASED BAR CODE ERROR DETECTION AND CORRECTION

BACKGROUND OF THE INVENTION

1. Field of the Invention

The present invention relates generally to improvements in systems for reading bar codes, and particularly to advantageous aspects of a system and methods for the detection and correction of errors in the reading of bar codes.

2. Description of the Prior Art

Bar coding systems, such as the Uniform Product Code (UPC) system, are commonly used to identify items, such as products for sale in a retail store. In such systems, bar codes consisting of a series of bars and spaces of varying widths are printed onto labels that are affixed to the products for sale, or are printed directly onto the product packaging. Scanners at the checkout terminal are then used to read the bar codes. This approach allows more information to be entered in less time, as scanning requires significantly less time than manually entering pricing and product identification information. Further, the use of bar codes eliminates errors arising from keyboarding errors by checkout personnel.

Unfortunately, bar-coded labels are not always printed perfectly. Imperfections caused by the printing process frequently render the printed bar code unreadable to the bar code scanning equipment. Such cases require human intervention. Typically, the method of human intervention is to enter the bar code data manually into a keyboard, terminal, or other input device. The prevalence of this problem is one reason that the data on most bar-coded labels are printed in human-readable form adjacent to the bars and spaces comprising the bar code itself.

Each human intervention produces a delay in the scanning process. There is thus a need for a scanning system that minimizes the number of human interventions required.

SUMMARY OF THE INVENTION

One aspect of the invention provides a system for correcting improperly printed or otherwise defective bar codes. The system scans a bar code and determines whether the scanned bar code data is correct. If the scanned bar code data is incorrect, the system uses the incorrect scanned bar code data to create a scan-based printhead model. Manually entered data is then used to construct an active printhead model. The scan-based printhead model and the active printhead model are then compared in order to identify printhead defects, which are stored to correct future bar code scans.

Additional features and advantages of the present invention will become apparent by reference to the following detailed description and accompanying drawings.

DETAILED DESCRIPTION

The present invention provides a bar code scanning system that decreases the number of human interventions required to enter data from bar codes having errors. The system learns from previously scanned bar code errors requiring human intervention in order to correctly read later scanned bar codes having similar errors. The present system may be used in conjunction with previously developed scanning systems, including those disclosed in U.S. Pat. Nos. 5,262,625, 5,276,316, and 5,767,498, all owned by the assignee of the present application and incorporated herein by reference in their entirety.

Figure 1:
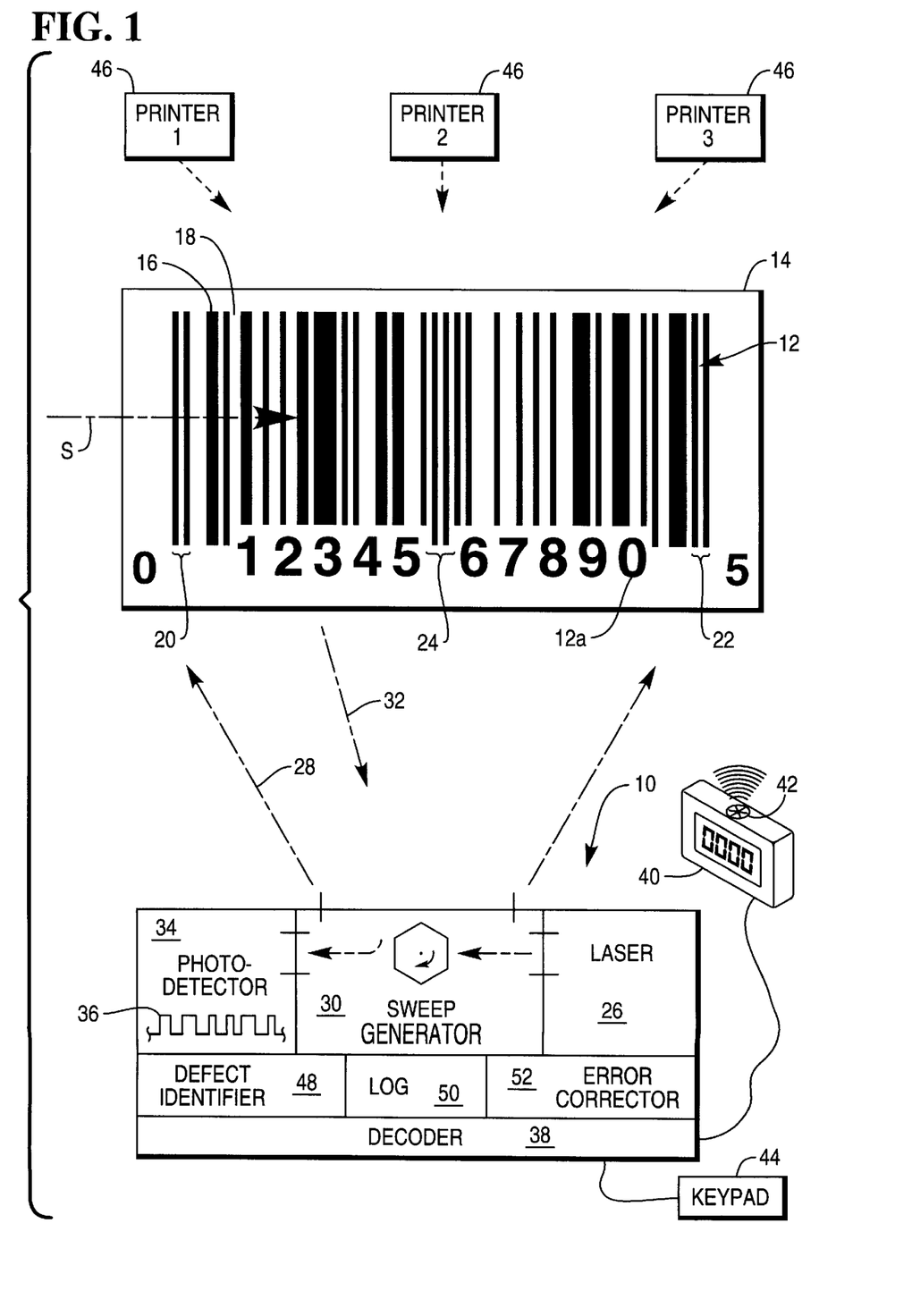
FIG. 1 is a schematic representation of a scanning system in accordance with an exemplary embodiment of the present invention.

FIG. 1 shows a schematic diagram of an exemplary embodiment of a laser bar code scanner 10 according to the present invention. The scanner 10 scans and decodes a conventional bar code 12 printed on a suitable label 14. The bar code 12 may also be printed directly onto product packaging. The bar code 12 shown in FIG. 1 includes a plurality of dark bars 16 and white spaces 18, which are straight and parallel to each other. The bars and spaces are arranged in a plurality of sequential groups defining respective characters of equal width. In the UPC symbology, a character is defined as having two bars 16 and two spaces 18 of varying widths. The specified width of a single UPC character must, by specification, be seven modules, each module being dark or white. Thus, each bar 16 consists of one or more contiguous dark modules, and each space 18 consists of one or more contiguous white modules. It should be noted that although the present invention is discussed in connection with UPC coding, it will be appreciated that the invention is equally applicable to other bar codes and coding systems.

In the exemplary bar code 12 shown in FIG. 1, the bar code conventionally starts with a left margin character 20, ends with a right margin character 22, and has a center reference character 24, with the remaining bars and spaces defining desired data characters. As indicated above, each of the data characters has a total width of seven modules, each of which can be either dark or light, and which together form two bars and two spaces. As further shown in FIG. 1, the encoded data is typically also printed in human-readable form 12a underneath the bar code 12.

As shown in FIG. 1, the scanner 10 includes a conventional mechanism for optically scanning the bar code 12 sequentially across the bars 16 and spaces 18 over the total width of the bar code 12 from the left margin character 20 to the right margin character 22. In the illustrated embodiment of the invention, scanning is accomplished by using a laser 26 which emits a suitable laser beam 28 that is scanned across the face of the bar code 12 by a sweep generator 30, which may take the form of a rotating multifaceted mirror. The laser beam 28 is scanned transversely across the bar code 12 in a scan direction S so that back-scattered light 32 reflects off the bars 16 and space 18 back to the scanner 10. Since the bars 16 are dark, very little light is back-scattered therefrom, whereas the spaces 16 are substantially white and more effectively back-scatter light to the scanner 10.

A photodetector 34 is provided in the scanner 10 and is suitably optically aligned therein for receiving the back-scattered light 32 and producing an electrical bar code signature 36 alternating in intensity between maximum and minimum values corresponding with the backscattered light 32 from the spaces 18 and bars 16, respectively. The time duration of the maximum and minimum intensity portions of the signature 36 corresponds with the varying widths of the bars and spaces. Since the scan beam 28 is scanned across the bar code 12 at a known and constant speed, the bar code signature 36 is representative of the bar code 12 itself and may be decoded in a decoder 38 specifically configured for the corresponding bar code symbology printed on the label 14.

The decoder 38 may take any conventional form and is typically a digitally programmable microprocessor containing suitable software for analyzing the bar code signature 36 and decoding the data contained therein. The scanner 10 is electrically connected to a suitable display 40, which may be used for displaying certain information encoded in the bar code 12, such as the price of a consumer product represented by the bar code. When the bar code 12 is accurately scanned and decoded, the data may be presented on the display 40, and a small speaker 42 operatively joined to the scanner 10 may beep to indicate successful decoding of the bar code 12.

When the bar code 12 cannot be decoded, human intervention is required. After a few unsuccessful attempts to scan the bar code label, a human operator will then enter the bar-coded information by hand at a numerical keypad 44, using the numerical data 12a printed underneath the bar code 12. The keypad 44 can be part of a point-of-sale (POS) terminal that is operatively coupled to the scanning system 10.

The bar code 12 shown in FIG. 1 is typically printed using a conventional linear printer 46, three of which are illustrated schematically in FIG. 1. Multiple printers 46 are illustrated because the scanner 10 is typically used in a retail store, in which the bar codes may be printed in-house or by outside suppliers using a substantial number of different printers 46.

Errors in the bar code 12 may result from defects in the printer 46 used to print the bar code label 14. Accordingly, the scanning system 10 includes a printhead defect identifier module 48 for identifying printhead defects. These identified defects are then stored in a log 50, which are used by an error corrector module 52 to correct future scans. These operations are described in greater detail below.

Figure 1A:
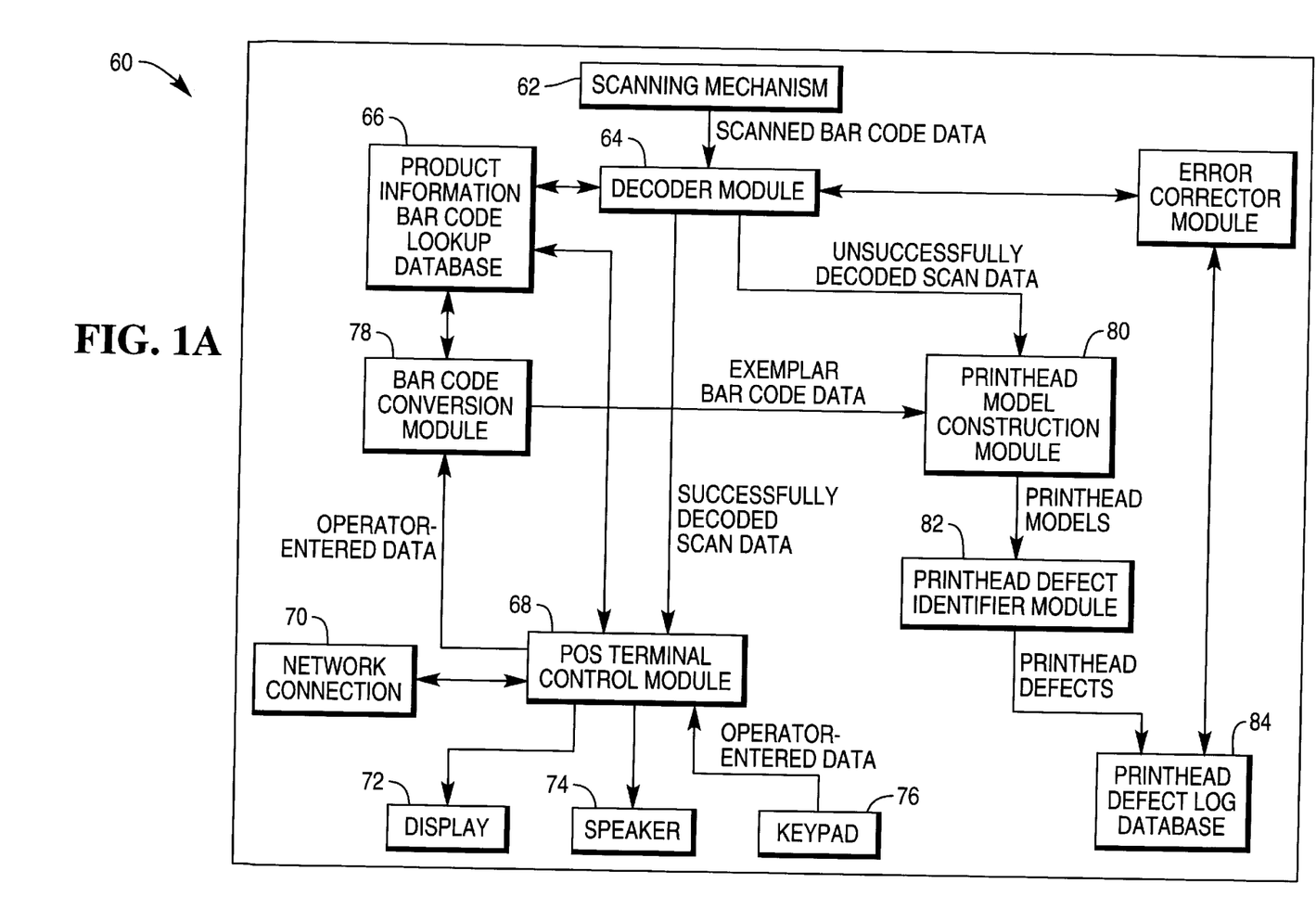
FIG. 1A is a schematic representation of a scanning system in accordance with a further exemplary embodiment of the present invention.

FIG. 1A shows a schematic diagram of a further embodiment of a scanning system 60 according to the present invention. The scanning system 60 scans a bar code using a scanning mechanism 62, such as the laser 26, sweep generator 30, and photodetector 34 shown in FIG. 1. The scanned bar code data obtained by the scanning mechanism 62 is passed to a decoder module 64, which attempts to decode the scanned data by accessing a product information bar code lookup database 66. If the decoding operation is successful, the decoded bar code data is then passed to a POS terminal control module 68 for completing the transaction. The POS terminal may, if desired, be provided with a network connection 70. As indicated above, when the scanning and decoding operations have been successful, product information is shown on a display 72 and a beep is sounded on a speaker 74.

If the decoder 64 is unable to decode the scanned bar code data, then the data must be entered manually by a human operator at a keypad 76 provided at the POS terminal. The operator-entered data is then passed to the POS terminal control module 68 for further processing. The POS terminal control module has access to the product information database 66 for finding the product data associated with the operator-entered data.

As described in further detail below, where a printhead defect has caused the decoder 64 to be unable to decode the scanned bar code data, the scanned bar code data and the operator-entered data are used to create two printhead models that are compared in order to identify the specific printhead defect. Towards that end, the operator-entered data is converted into a bar-code equivalent in a bar code conversion module 78 having access to the algorithms for the various bar code symbologies, permitting conversion of numeric code into bars and spaces. The resulting exemplar bar code data is then passed to a printhead model construction module 80 together with the scanned bar code data. The resulting printhead models are passed to a printhead defect identifier module 82, which identifies specific printhead defects that are then stored in a printhead defect log database 84. The stored printhead defects are then available for use by an error corrector module 86 in correcting future scanned data.

Figure 2:
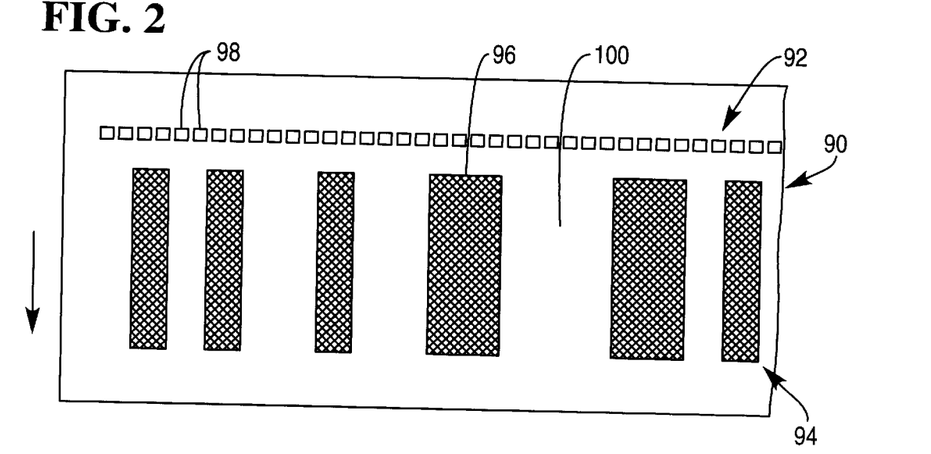
FIG. 2 is an enlarged left-margin portion of an exemplary bar code label and a linear printhead used to print the bar code label.

FIG. 2 is an enlarged left-margin portion of an exemplary bar code label 90 and a printer 92 used to print a bar code 94 onto the label 90. The linear printer 92 is illustrated schematically positioned adjacent to the label 90 for conventionally printing the bars 96 thereon. The linear printer 92 includes a linear printhead defined by a row of individual thermal print elements 98. Each print element 100 in a linear thermal printer is heated under individual control for use with thermally sensitive paper defining the label 90. As the label 90 illustrated in FIG. 2 is moved in a downward direction as shown relative to the printhead elements 98, respective print elements 98 are heated for thermally darkening the label 90 below the corresponding elements 98 for producing the desired bars 96, with the spaces 100 being formed where the respective print elements 92 are unheated.

The linear resolution of the printer and the minimum required width for each module determines the number of printhead elements that must be used to print each module in the bar code. One representative thermal printhead has a linear resolution of 137 print elements per inch, or 7.3 mils per element, and can therefore only print modules having a width that is a multiple of 7.3 mils. By specification, the UPC minimum module must exceed 9 mils. Therefore, the narrowest module that could be printed by the representative printer that would cover the minimum bar width size would be 14.6 mil, i.e., the width of two adjacent print elements 98. The majority of conventional/linear printheads used for printing bar code labels use either two or three print elements 98 for each bar code module, with FIG. 2 illustrating the use of two print elements 98 per module. It will be recalled that each UPC character is composed of seven modules that form two bars and two spaces of varying widths.

A common failure of a linear printer 92 is the breakage of an individual printhead element 98. In this case, the printer 92 is unable to print at the location of the failed element. This will result in a white space on the label where a dark space is intended. For a bar code label, a failed element found where a dark bar is required will produce a recurring thin gap along the length of the bar where printing is absent. This gap typically leads to decoding failure.

Figure 3:
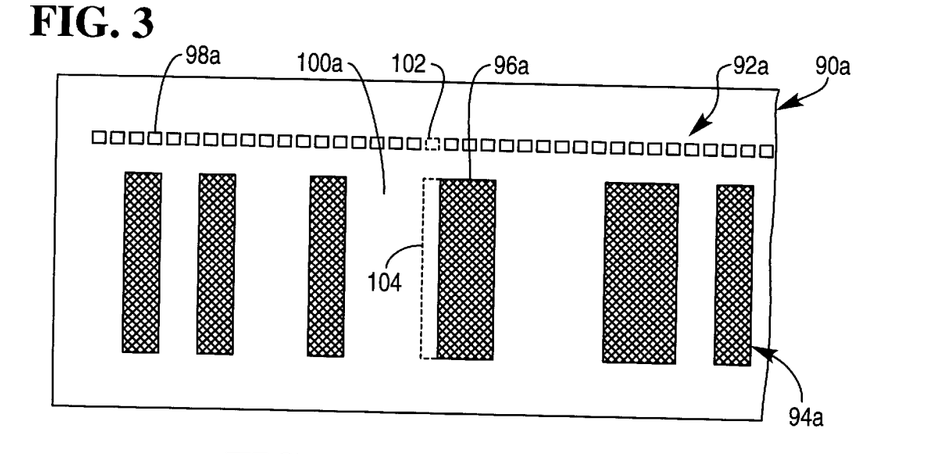
FIG. 3 illustrates a defective printhead element causing an error in the bar code.
Figure 4:
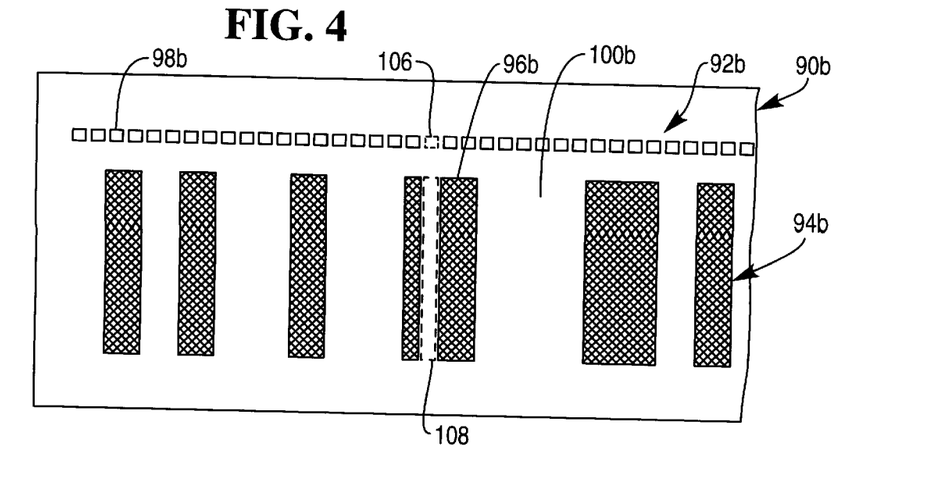
FIG. 4 illustrates another example of a defective printhead element causing a different error in the bar code.

FIG. 3 shows a bar-coded label 90a and a printer 92a corresponding to the bar-coded label 90 and printer 92 of FIG. 2, except that a failure of one element 102 in the array of printhead elements 98a has occurred. This defective element 102 produces a corresponding gap 104 in the bar code 94a. FIG. 4 shows a bar-coded label 90b and printer 92b where a printhead element failure 106 has occurred in a different position in the array of printhead elements 98b, producing a corresponding gap 108 in a different location in the bar code 94b.

The present invention provides a scanning system that is able to identify printhead defects such as those shown in FIGS. 3 and 4 based upon the information obtained from scanning the bar code and upon the keypad-entered information obtained from the human intervention that follows when the system is unable to decode the scanned bar code.

Figure 5:
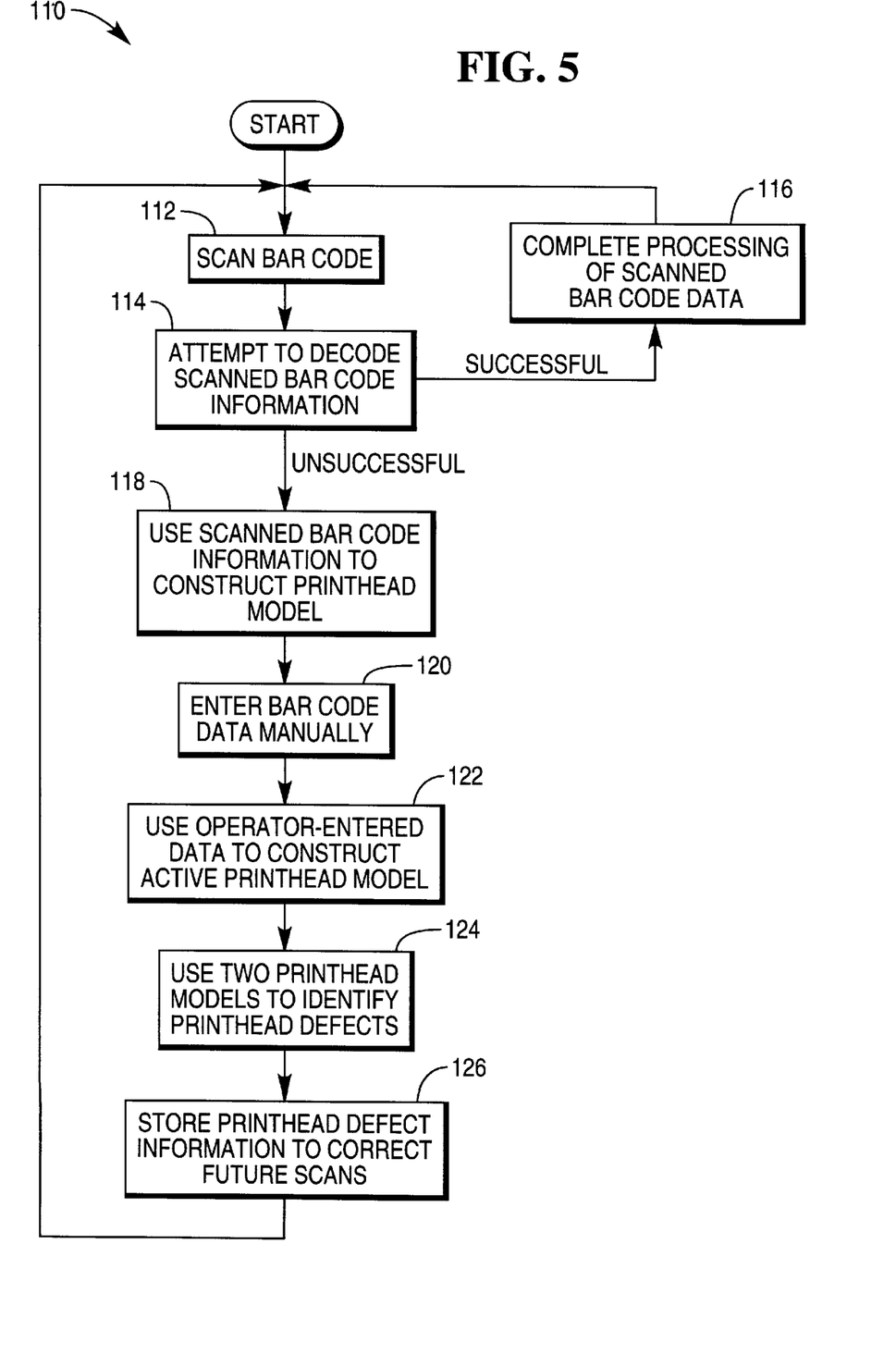
FIG. 5 is a flowchart of an exemplary embodiment of a printhead defect identification method in accordance with an aspect of the present invention.

FIG. 5 shows a flowchart of a first embodiment of a printhead defect identification method 110 according to the present invention. In step 112, the bar code is scanned and, in step 114, the system attempts to decode the scanned information. If the system is able to decode the information, then, in step 116, the processing of that item is completed, and the system returns to step 112 to scan the next item.

However, if, in step 114, the system is unable to decode the scanned bar code information, then, in step 118, the scanned bar code information is used to construct a model of the printhead used to print the defective label, as described in greater detail below and illustrated in FIGS. 6 and 7. This model contains a representation of each printhead element and whether that printhead element has printed a dark segment onto the bar-coded label, or has left a white space. Presumably, because of the failure of the scanning system to decode the scanned information, at least one of these printhead elements has failed, and has therefore left a white space where a dark segment was required.

In step 120, the correct information is manually entered into the system by a human operator using a numerical keypad, such as keypad 44 shown in FIG. 1, or any other suitable input device. In step 122, which is described in greater detail below and illustrated in FIGS. 8 and 9, the operator-entered information is used to construct an active printhead model. This is a model of a hypothetical printhead in which each printhead element has correctly printed a dark segment or has left a white space to create an accurate bar code representation of the manually entered information. In step 124, the two printhead models are compared to identify specific printhead defects and, in step 126, the identified printhead defects are stored in a log, such as log 50 shown in FIG. 1, for use in correcting future defective bar code labels. The error correction operation is described in greater detail below and illustrated in FIGS. 10 and 11.

It should be noted that, in the present embodiment of the invention, it is contemplated that the system will be used to correct recurring errors, such as those caused by defective printhead elements. Thus, in a further embodiment of the invention, in order to distinguish between recurring errors and one-time errors (such as those caused, for example, by damage to the label or by the partial obscuring of the bar code by frost or other foreign matter), the system will accumulate defect information, but will only recognize an identified defect as a printhead defect when the occurrences of the particular defect have exceeded a predetermined threshold. Only these recognized printhead defects will be used to attempt to correct current scans.

Figure 6:
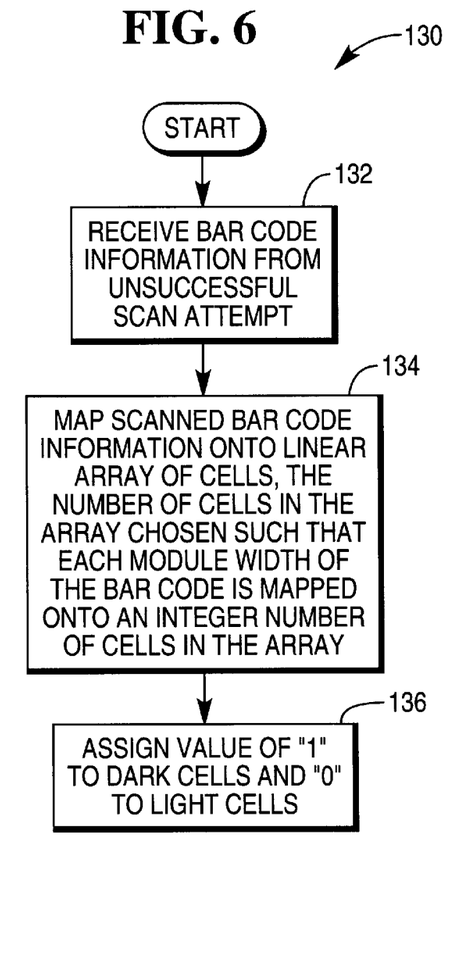
FIG. 6 is a flowchart of an exemplary embodiment of a printhead model construction method in accordance with the present invention.

FIG. 6 shows a flowchart of a model construction method 130 according to the present invention for constructing a model of a printhead used to print a defective label. In step 132, the system receives the scan information from an unsuccessful attempt to decode a bar-coded label. Where the failure to decode the bar-coded label results from a defective print element, the scanning system typically receives a sequence of bars and spaces that it is unable to decode because of the defect.

In step 134, the scanned bar code information is mapped onto a linear array of cells. As discussed above, the bars and spaces in a bar code are made up of a series of modules. The number of cells in the array is chosen such that each module width in the bar code can be mapped onto an integer number of cells. In the present illustrative embodiment of the invention, the number of cells in the array has been chosen such that there is a one-to-one correspondence between the cells in the array and the individual printhead elements in the linear printer used to print the scanned bar code.

Therefore, in the present illustrative embodiment, because the known printhead resolution is two printhead elements per module, and assuming that a single cell is used to represent each printhead element, the number of cells in the linear array is double the number of modules. If desired, an integer number of cells greater than one may be used to represent each printhead element, with a concomitant increase in the number of cells in the array. It will be appreciated that it would also be possible to practice the present invention without knowing the printhead resolution at all, so long as the linear array has enough cells to accurately map the defective portion of the scanned bar code information.

Finally, in step 136, a value of "1" is assigned to the cells in the array corresponding to the printhead elements that have printed dark segments, and a value of "0" is assigned to the printhead elements that have left a white space. Thus, the result of the modeling process is a binary string of 1's and 0's, each digit representing a printhead element.

Figure 7:
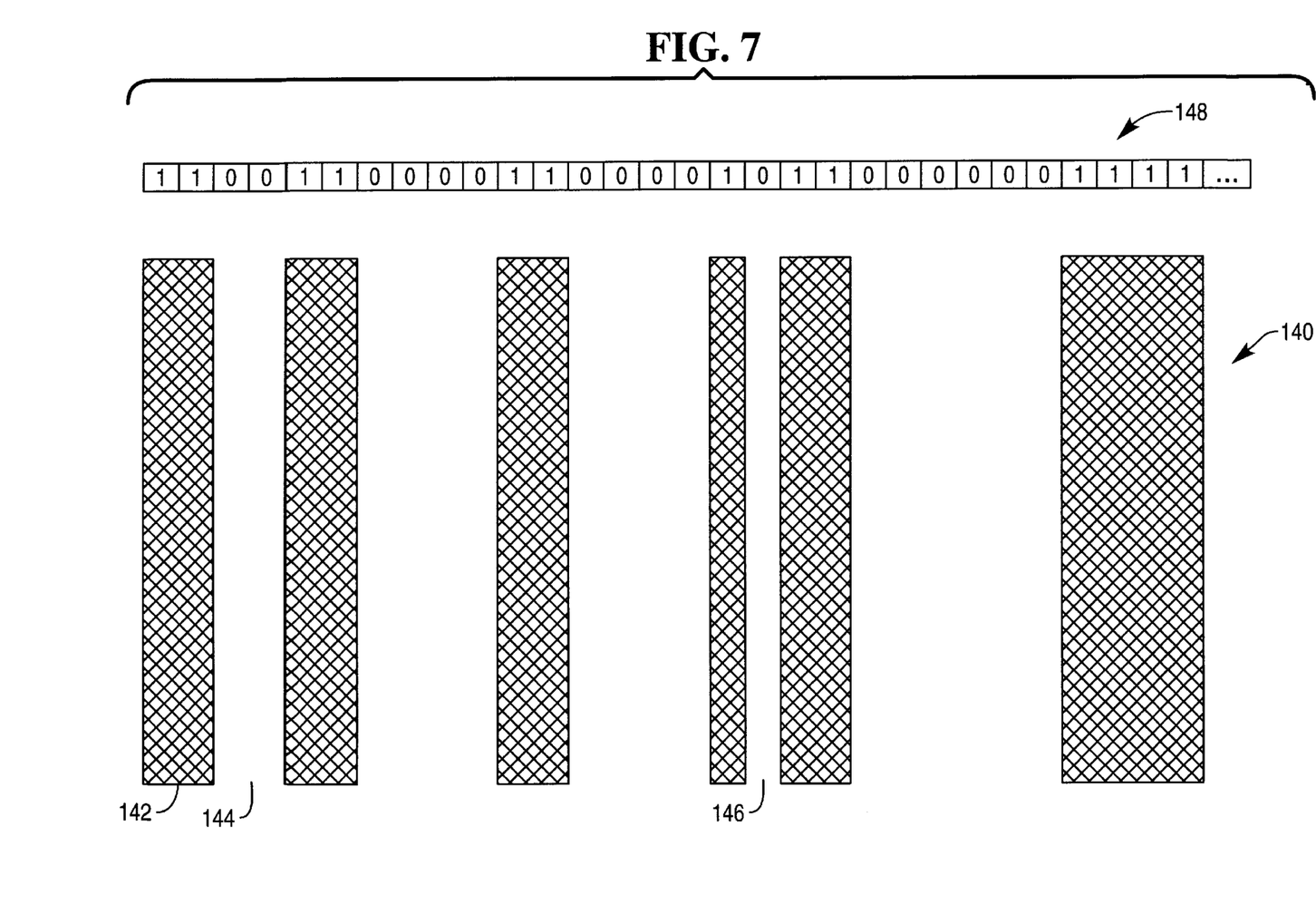
FIG. 7 is an enlarged left-margin portion of a scanned bar code information and a printhead model constructed from the scanned bar code information in accordance with the method illustrated in the FIG. 6 flowchart.

A printhead model 148 for the method of FIG. 6 is illustrated in FIG. 7. FIG. 7 shows the leftmost portion of a bar code 140 comprising a sequence of bars 142 and spaces 144. In addition, the bar code 140 includes an erroneous gap 146 like that seen in FIG. 4. Above the bar code 140 is the constructed printhead model 148 for the printhead that was used to print the bar code 140. The printhead resolution illustrated in the present example is two printhead elements per bar code module.

Figure 8:
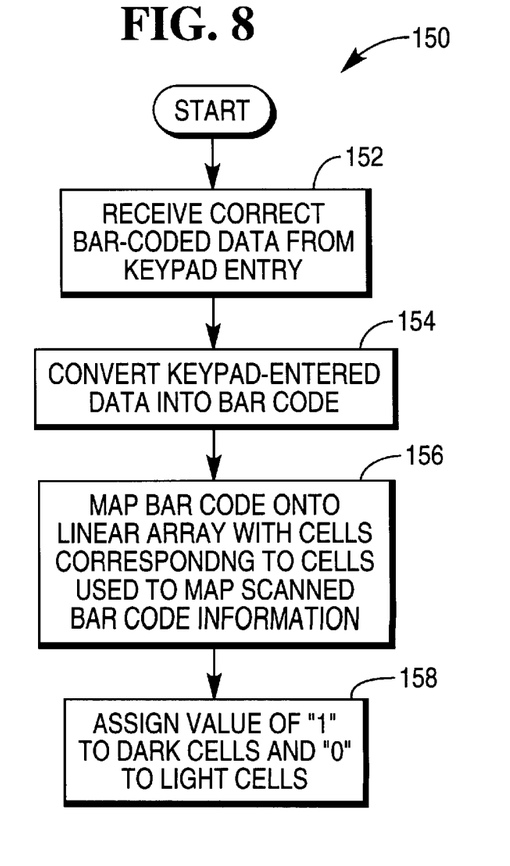
FIG. 8 is a flowchart of an exemplary embodiment of a method for constructing an active printhead model in accordance with the present invention.

FIG. 8 shows a model construction method 150 according to the present invention for constructing an active printhead model based upon the information entered manually at the time of a human intervention. In step 152, the system receives the correct data from the keypad entry. As indicated above, bar codes are typically printed with the encoded data also printed in alphanumeric form underneath the bar code to facilitate the human intervention process.

In step 154, the keypad-entered data is then converted into corresponding bar code information, i.e., a string of 1's and 0's representing a sequence of digital bars and spaces, including any margin or reference characters. The information required to perform this process is typically already available to the scanning system, inasmuch as this information is required into order to decode a properly scanned bar-coded label, and consequently is stored in memory in the scanner.

In step 156, after the keypad-entered data is converted into a bar code, the bar code is then mapped onto a linear array with cells corresponding to the cells used above to construct the scan-based printhead model. The mapping operation is similar to that described above. However, instead of starting with scanned bar-code information, the system starts with a bar code that has been generated from the keypad-entered data. In step 158, each cell that corresponds to a dark print segment is assigned a numerical value of "1," and each cell that corresponding to a white space segment is assigned a numerical value of "0." If desired, steps 154, 156, and 158 can be combined into a single operation.

Figure 9:
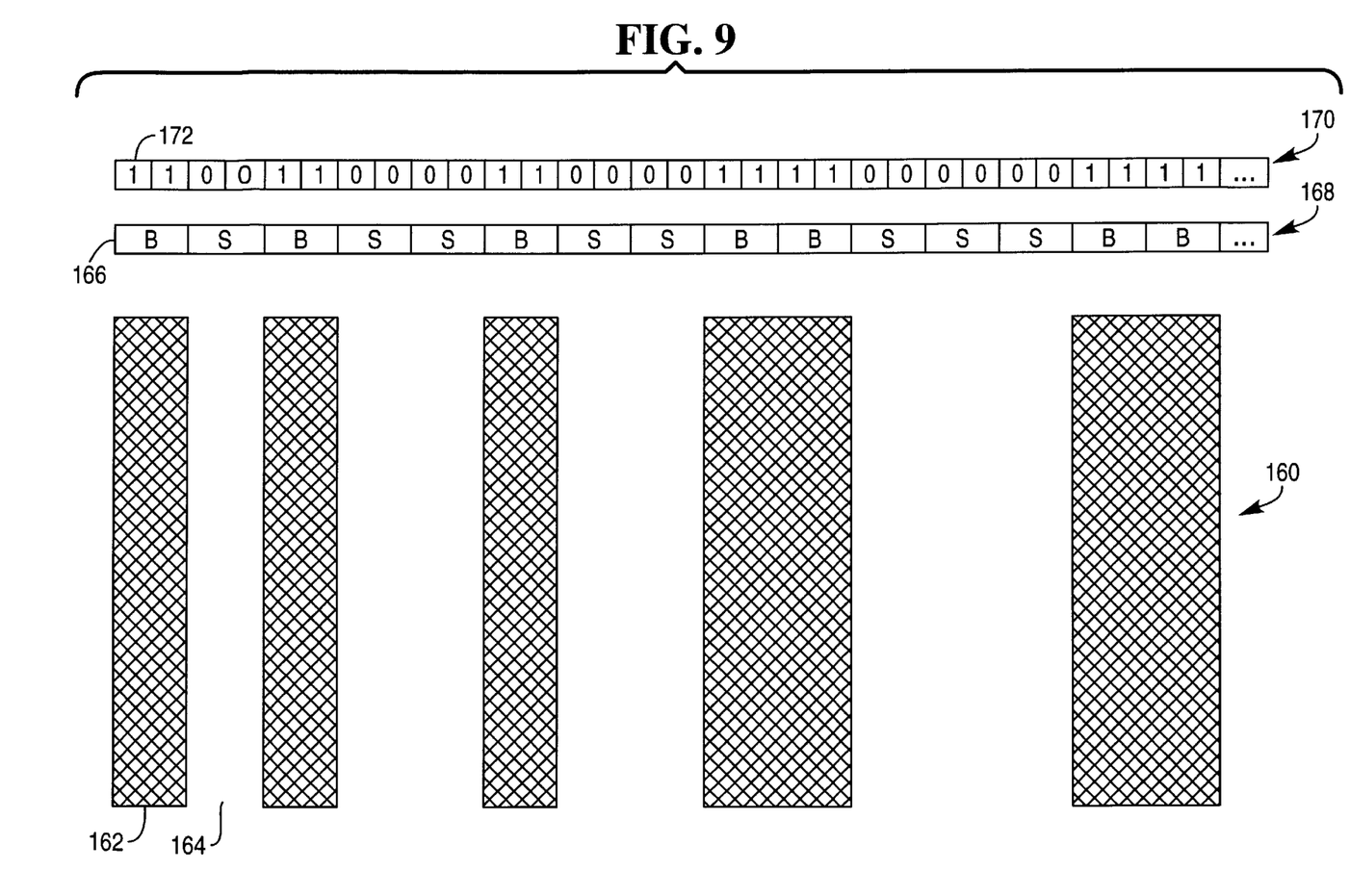
FIG. 9 is an enlarged left-margin portion of a bar code constructed based upon keypad-entered data and the active printhead model constructed from the data in accordance with the method illustrated in the FIG. 8 flowchart.

The method shown in FIG. 8 is illustrated in FIG. 9, which shows the leftmost portion of a bar code 120 that has been generated by the scanning system from keypad-entered data. The bar code 120 includes a series of bars 122 and spaces 124. Each bar 122 and space 124 includes one or more modules 126 that, for purposes of illustration, are laid out into a linear array 128 appearing immediately above the bar code 120. The letter "B" represents a bar module, and the letter "S" represents a space module. Above the array of modules 126, there is an active printhead model 130 constructed in accordance with the method illustrated in FIG. 8. Again, the current printhead resolution is two printhead elements per module, and each cell 132 in the active printhead model represents an individual printhead element.

Figure 10:
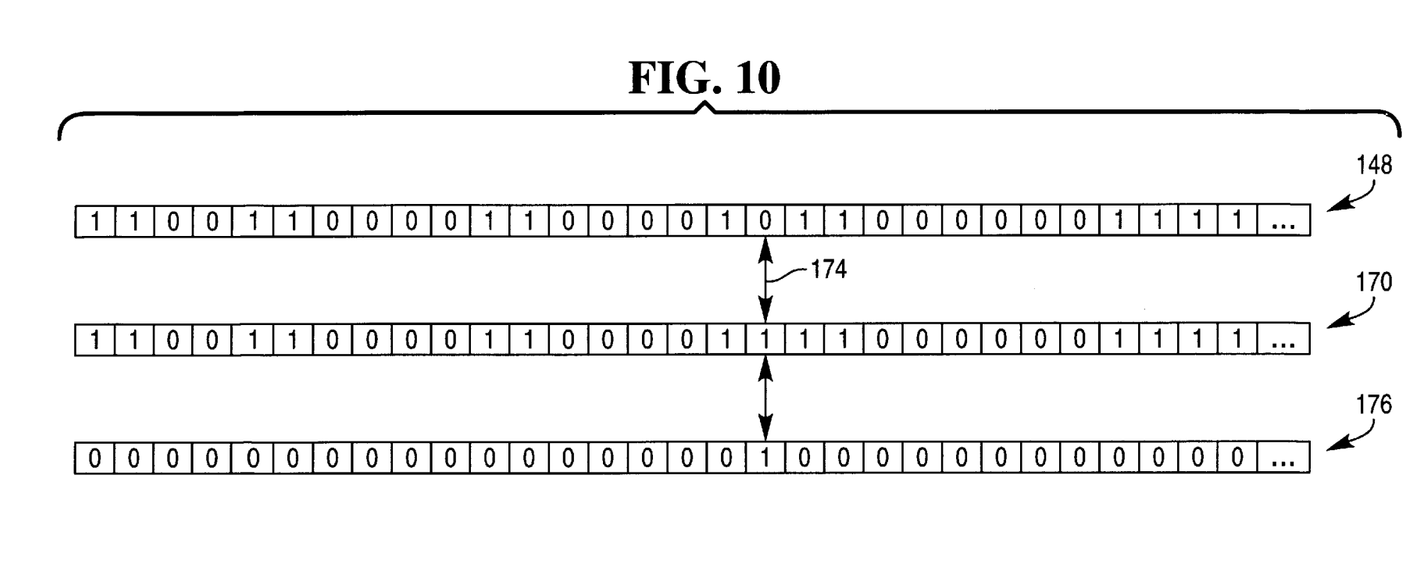
FIG. 10 is a diagram showing the identification of printhead defects based upon a comparison of the models constructed in FIGS. 6 through 9.

Finally, once the two printhead models have been constructed, they are compared to identify printhead defects. In the system shown in FIG. 1A, this operation would be performed by the printhead defect identifier module 80. The comparison operation is illustrated in FIG. 10. The top linear array is the model 148 constructed from the scanned bar-code information using the method illustrated in FIGS. 6 and 7. The middle linear array is the active printhead model 170 constructed from the data manually entered by keypad. The system then compares the two models to determine where they differ. In the illustrated example, there is one point 174 at which the models differ. It appears that the printhead has failed to print a required segment. This is reflected in the printhead defect array 176, which marks the defective segment with a numerical "1." Thus, the printhead defect information is a string of binary 1's and 0's, each digit in the string corresponding to an identified printhead defect. Where the resolution of the linear arrays in the printhead models is chosen to coincide with the resolution of the printhead used to print the labels, it will be seen that each digit in the string corresponds to an individual printhead element. However, the invention can also be practiced with the linear arrays in the printhead models having a higher resolution than the resolution of the printhead used to print the labels.

Figure 11:
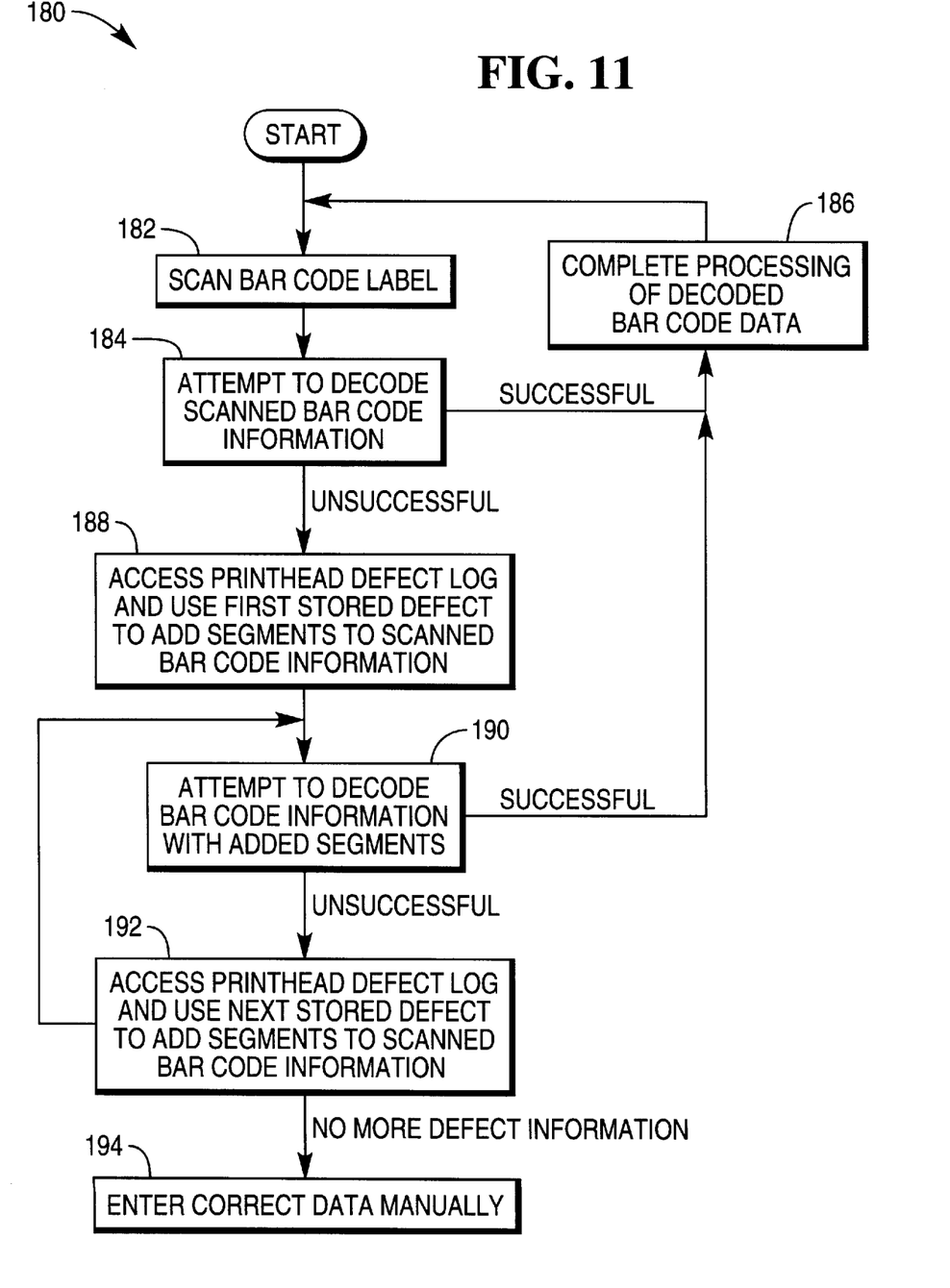
FIG. 11 is a flowchart of an exemplary embodiment of a method according to the present invention for correcting future scans based upon stored printhead defect information.

FIG. 11 shows a flowchart of an exemplary embodiment of an error correction method 180 according to the present invention for correcting future scans based upon stored printhead defect information. The illustrated method 180 would be performed, for example, by the error corrector 52 shown in FIG. 1 or the error corrector module 84 shown in FIG. 1A. In step 182, the bar code label is scanned and, in step 184, the scanning system attempts to decode the scanned bar code information. If the system is successful in the decoding operation, then the bar code data is processed in step 186 and the next bar code label is scanned in step 182. If, however, the system is unable to decode the scanned bar code information, then, in step 188, the printhead defect log is accessed, and the first stored printhead defect is used to add segments to the scanned bar code information.

For example, assuming that model 148 in FIG. 10 represents the current scanned bar code information and that model 176 in that figure represents a stored printhead defect, the system would attempt to add the segment indicated in model 176 to the current bar code information to arrive at a corrected bar code, represented by model 170 in FIG. 10. Returning to FIG. 11, in step 190 the system attempts to decode the bar code information with the added segments. If the system is successful, then the data is processed in step 186 and the next bar code is scanned in step 182.

However, if in step 190 the system is unable to decode the bar code information with the segments added in step 188, then, in step 192, the system accesses the printhead defect log to retrieve the next stored printhead defect to add other segments to the scanned bar code information. Again, in step 190, the system attempts to decode the scanned bar code information with the added segments, proceeding to step 186 if the bar code can be decoded, but returning to step 192 if the decoding operating is unsuccessful.

As shown in FIG. 11, the system repeats steps 190 and 192 until either the decoding operation is successful or until there are no more stored printhead defects in the log. If the latter occurs, then, in step 194, the correct bar code data is entered manually. At this point, the system can go to step 118 of the method shown in FIG. 5 to construct scan-based and active printhead models in order to identify any newly occurring printhead defects.

Although the invention as described above addresses problems in bar-coded labels that are assumed to be caused by faulty printing equipment, the invention may also be applied to detect and correct similar problems in bar-coded labels regardless of the actual cause, so long as the errors to be corrected have repeated features that can be modeled using the above-described system and methods. Thus, the invention increases scanner throughput by reducing or eliminating human intervention necessitated by defective bar code labels. Also, while the present invention is disclosed as performing processing within the bar code scanner, it will be recognized that this processing can be off-loaded and performed elsewhere within the overall system, if desired.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method for identifying defects in a printhead used to print bar codes comprising the following steps:

(a) scanning a bar code;
 (b) determining whether the scanned bar code data is correct;

(c) constructing a scan-based printhead model using the scanned bar code data, if the scanned bar code is incorrect;

(d) entering the correct bar code data manually;

(e) using the manually entered data to construct an active printhead model;

(f) comparing the scan-based printhead model with the active printhead model to identify printhead defects; and (g) storing the identified printhead defects to correct future bar code scans.

2. The method of claim 1, wherein in step (c) the scan-based printhead model is constructed by mapping the scanned bar code information onto a linear array with cells corresponding to individual printhead elements.

3. The method of claim 2, wherein in step (c), after the scanned bar code information is mapped onto the linear array, a value of 1 is assigned to dark cells, and a value of 0 is assigned to white cells.

4. The method of claim 1, wherein in step (e) the active printhead model is constructed by converting the manually entered data into a bar code and mapping the bar code onto a linear array with cells corresponding to individual printhead elements.

5. The method of claim 4, wherein in step (e), after the bar code is mapped onto the linear array, a value of 1 is assigned to dark cells, and a value of 0 is assigned to white cells.

6. The method of claim 1, wherein in step (f) the printhead defects are identified as those printhead locations in the scan-based and active printhead models where a segment of the scan-based printhead model fails to match a corresponding segment of the active printhead model.

7. The method of claim 1, wherein in step (g), the stored printhead defects are used to correct future scans by correcting individual segments in the scanned data as indicated by the stored printhead defects.

8. A scanning system, comprising:

a scanner for scanning a bar code;

an input for receiving operator-entered data if a bar code is erroneous;

a defect identifier for identifying defects in printheads used to print the erroneous bar code, the defect identifier constructing a scan-based printhead model based upon scanned bar code information and an active printhead model based upon operator-entered data and identifying printhead defects by comparing the two models;

a log for storing identified printhead defects; and an error corrector for using stored printhead defects to correct erroneous scanned bar code information.

9. The scanning system of claim 8, wherein the defect identifier constructs the scan-based printhead model by mapping the scanned bar code information onto a linear array with cells corresponding to individual printhead elements.

10. The system of claim 9, wherein a value of 1 is assigned to dark cells in the scan-based printhead model array and a value of 0 is assigned to light cells.

11. The scanning system of claim 8, wherein the defect identifier constructs the active printhead model by converting the operator-entered data into a bar code and mapping the bar code onto a linear array with cells corresponding to individual printhead elements.

12. The scanning system of claim 11, wherein a value of 1 is assigned to dark cells in the active printhead model array and a value of 0 is assigned to light cells in the array.

* * * * *